US010919401B2

(12) United States Patent
Elshaer et al.

(10) Patent No.: US 10,919,401 B2
(45) Date of Patent: Feb. 16, 2021

(54) INTEGRATED WIRELESS POWER TRANSFER SYSTEM

(71) Applicant: FORD GLOBAL TECHNOLOGIES, LLC, Dearborn, MI (US)

(72) Inventors: Mohamed Elshaer, Dearborn, MI (US); Chingchi Chen, Ann Arbor, MI (US); Mark J. Ferrel, Brighton, MI (US); John Paul Gibeau, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 286 days.

(21) Appl. No.: 15/404,853

(22) Filed: Jan. 12, 2017

(65) Prior Publication Data
US 2018/0194236 A1 Jul. 12, 2018

(51) Int. Cl.
*H02J 7/02* (2016.01)
*H02J 50/12* (2016.01)
*B60L 53/122* (2019.01)
*B60L 11/18* (2006.01)
*B60L 53/66* (2019.01)

(52) U.S. Cl.
CPC ........... *B60L 53/122* (2019.02); *B60L 11/182* (2013.01); *B60L 53/66* (2019.02); *H02J 7/025* (2013.01); *H02J 50/12* (2016.02); *B60L 2210/30* (2013.01); *B60L 2210/40* (2013.01)

(58) Field of Classification Search
CPC ........... Y02E 60/12; H02J 7/025; H02J 50/12; H01F 38/14; Y02T 90/122; B60L 11/182; B60L 11/1838; B60L 2210/30; B60L 2210/40

USPC .......................................... 320/108; 307/104
See application file for complete search history.

(56) References Cited

U.S. PATENT DOCUMENTS

| 6,058,036 A * | 5/2000 | Endo ................. H02M 7/53875 363/98 |
| 2004/0233008 A1* | 11/2004 | Kobayashi ............. H03B 5/368 331/135 |
| 2011/0254377 A1 | 10/2011 | Wildmer et al. |
| 2013/0094248 A1* | 4/2013 | Jacques ................. H02M 3/337 363/19 |
| 2013/0214591 A1 | 8/2013 | Miller et al. |
| 2014/0021922 A1* | 1/2014 | Kim ...................... H02J 7/0003 320/111 |
| 2014/0327397 A1* | 11/2014 | Houivet ................ B60L 11/182 320/108 |
| 2015/0077046 A1 | 3/2015 | Huang et al. |
| 2015/0357827 A1* | 12/2015 | Muratov ................. H02J 50/10 307/104 |
| 2015/0357863 A1* | 12/2015 | Sadakata ................. H02J 50/80 320/108 |
| 2016/0365752 A1* | 12/2016 | Misawa .................. H02J 7/025 |

(Continued)

*Primary Examiner* — Nathaniel R Pelton
*Assistant Examiner* — Mohammed J Sharief
(74) *Attorney, Agent, or Firm* — David B. Kelley; Brooks Kushman P.C.

(57) ABSTRACT

A charging system includes an inverter configured to receive rectified mains line voltage and current to power a primary coil to induce charge current in a secondary coil of a vehicle. The charging system also includes a controller configured to alter a switching frequency of the inverter based on charge voltage data from the vehicle to cause the inverter to operate to drive a voltage of an energy storage capacitor of a battery charger of the vehicle toward a constant value.

14 Claims, 7 Drawing Sheets

(56) References Cited

U.S. PATENT DOCUMENTS

2017/0072807 A1\* 3/2017 Matsumoto ........... H02J 7/0055
2018/0062445 A1\* 3/2018 Hwang .................. H02J 50/12

\* cited by examiner

INTEGRATED WIRELESS POWER TRANSFER SYSTEM

TECHNICAL FIELD

The present disclosure relates to systems and methods for performing wireless power transfer.

BACKGROUND

The term "electric vehicle" can be used to describe vehicles having at least one electric motor for vehicle propulsion, such as battery electric vehicles (BEV) and hybrid electric vehicles (HEV). A BEV includes at least one electric motor, wherein the energy source for the motor is a battery that is re-chargeable from an external electric grid. An HEV includes an internal combustion engine and one or more electric motors, wherein the energy source for the engine is fuel and the energy source for the motors is a battery. The HEV battery may be a larger capacity battery that is rechargeable from the external electric grid and may serve as the main source of energy for vehicle propulsion until the battery depletes to a low energy level, at which time the HEV may at least partly rely on the internal combustion engine for vehicle propulsion.

SUMMARY

A charging system includes an inverter configured to receive rectified mains line voltage and current to power a primary coil to induce charge current in a secondary coil of a vehicle, and a controller configured to alter a switching frequency of the inverter based on charge voltage data from the vehicle to cause the inverter to operate to drive a voltage of an energy storage capacitor of a battery charger of the vehicle toward a constant value.

A method for a vehicle includes altering a switching frequency of an inverter, by a controller, based on charge voltage data from the vehicle to cause the inverter to operate to drive a voltage of an energy storage capacitor of a battery charger of the vehicle toward a constant value, wherein the inverter is configured to receive rectified mains line voltage and current to power a primary coil to induce charge current in a secondary coil of the vehicle.

A system for a vehicle includes a traction battery, and an energy storage capacitor configured to transfer charge current for the battery, wherein the capacitor is connected between the battery and both of a plug-in charge port configured to receive the charge current delivered conductively and a vehicle coil configured to generate the charge current responsive to being in proximity to a source coil.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
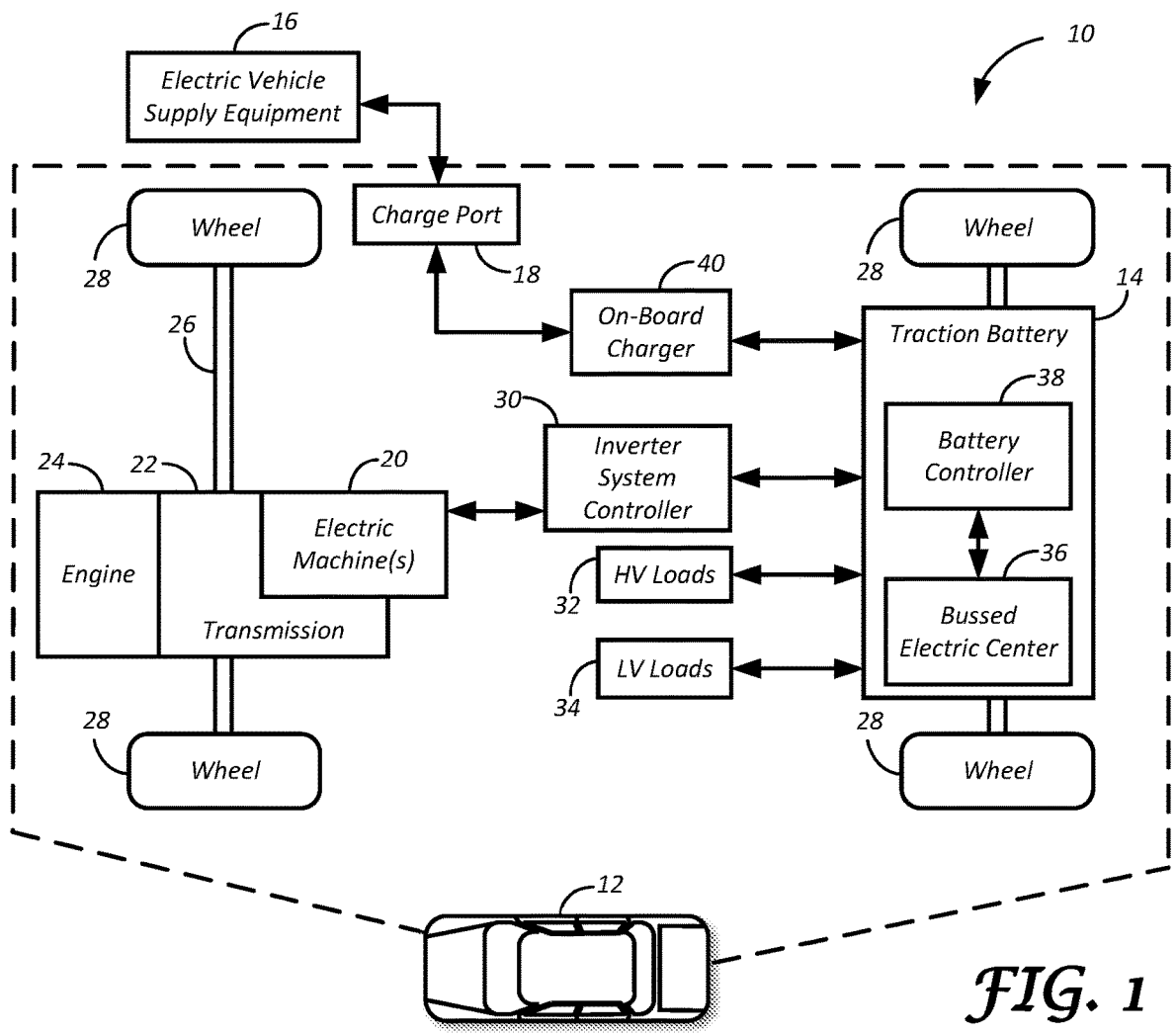
FIG. 1 is a block diagram illustrating a plug-in charging system for a hybrid electric vehicle (HEV)

FIG. 1 depicts a hybrid electric vehicle (HEV) 12 power system 10. An HEV 12, hereinafter vehicle 12, may be of various types of passenger vehicles, such as crossover utility vehicle (CUV), sport utility vehicle (SUV), truck, recreational vehicle (RV), boat, plane or other mobile machine for transporting people or goods. It should be noted that the illustrated system 10 is merely an example, and more, fewer, and/or differently located elements may be used.

The vehicle 12, may comprise a hybrid transmission 22 mechanically connected to an engine 24 and a drive shaft 26 driving wheels 28. The hybrid transmission 22 may also be mechanically connected to one or more electric machines 20 capable of operating as a motor or a generator. The electric machines 20 may be electrically connected to an inverter system controller (ISC) 30 providing bi-directional energy transfer between the electric machines 20 and at least one traction battery 14.

The traction battery 14 typically provides a high voltage (HV) direct current (DC) output. In a motor mode, the ISC 30 may convert the DC output provided by the traction battery 14 to a three-phase alternating current (AC) as may be required for proper functionality of the electric machines 20. In a regenerative mode, the ISC 30 may convert the three-phase AC output from the electric machines 20 acting as generators to the DC voltage required by the traction battery 14. In addition to providing energy for propulsion, the traction battery 14 may provide energy for high voltage loads 32, such as compressors and electric heaters, and low voltage loads 34, such as electrical accessories an auxiliary battery, and so on.

The traction battery 14 may comprise a plurality of battery cells (not shown), e.g., electrochemical cells, electrically connected to a bussed electrical center (BEC) 36, or a plurality of connectors and switches enabling the supply and withdrawal of electric energy to and from the battery cells. In one example, the BEC 36 includes a positive main contactor electrically connected to a positive terminal of the battery cells and a negative main contactor electrically connected to a negative terminal of the battery cells, such that closing the positive and/or negative main contactors may enable the flow of electric energy to and from the battery cells.

A battery controller 38 may be electrically connected to the BEC 36 and may control, such as by outputting a signal to the BEC 36, energy flow to and from the battery cells via the BEC 36. In one example, the battery controller 38 may be configured to monitor and manage temperature and state of charge of each of the battery cells. The battery controller 38 may be further configured to output a signal to the BEC 36 indicative of a request to enable the supply and withdrawal of electric energy in response to detecting that temperature and/or SOC of the battery cells is above or below a specified threshold or in response to a signal or request received from another vehicle controller, such as, but not limited to, chassis controller, powertrain controller, brake controller, heating ventilation and air conditioning controller, and so on. While the traction battery 14 is described herein as including electrochemical cells, other types of energy storage device implementations, such as capacitors, are also contemplated.

The vehicle 12 may be configured to recharge the traction battery 14 via a connection to a power grid (not shown). The vehicle 12 may, for example, cooperate with electric vehicle supply equipment (EVSE) 16 of a charging station to coordinate the charge transfer from the power grid to the traction battery 14. In one example, the EVSE 16 may have a charge connector for plugging into a charge port 18 of the vehicle 12, such as via connector pins that mate with corresponding recesses of the charge port 18. The charge port 18 may be electrically connected to an on-board power conversion controller or charger 40. The charger 40 may be in communication with the battery controller 38 and may condition the power supplied from the EVSE 16 to provide the proper voltage and current levels to the traction battery 14 according to one or more signals from the battery controller 38.

The vehicle 12 may be designed to receive single- or three-phase AC power from the EVSE 16. The vehicle 12 may further be capable of receiving different levels of AC voltage including, but not limited to, Level 1 120 volt (V) AC charging, Level 2 240V AC charging, and so on. In one example, both the charge port 18 and the EVSE 16 may be configured to comply with industry standards pertaining to electrified vehicle charging, such as, but not limited to, Society of Automotive Engineers (SAE) J1772, J1773, J2954, International Organization for Standardization (ISO) 15118-1, 15118-2, 15118-3, the German DIN Specification 70121, and so on.

In an example, the charger 40 may be configured to transmit a signal to the battery controller 38 indicative of a request to charge the traction battery 14 in response to determining that the vehicle 12 has been connected to the EVSE 16. Additionally or alternatively, the vehicle 12 may be configured to receive wireless charging, such as via a charge transfer using an electromagnetic field, such as using an example charging system illustrated in FIG. 2. In response to receiving the request from the charger 40, the battery controller 38 may command the BEC 36 to open or close one or more switches, e.g., positive and negative main contactors, enabling the transfer of electric energy between the EVSE 16 and the traction battery 14.

In some examples, the BEC 36 may include a pre-charge circuit configured to control an energizing process of the positive terminal by delaying the closing of the positive main contactor until voltage level across the positive and negative terminals reached a predetermined threshold. Following the closing of the positive and negative main contactors, the transfer of electric energy may occur between the traction battery 14 and one or more components or systems, such as, but not limited to, the EVSE 16, the electric machines 20, and/or the high and low voltage loads 32, 34.

While FIG. 1 depicts a hybrid electric vehicle, the description herein is equally applicable to a pure electric vehicle. For a pure electric vehicle, e.g., battery electric vehicle (BEV), the hybrid transmission 22 may be a gear box connected to the electric machine 20 and the engine 24 may not be present. The various components discussed may have one or more associated controllers to control and monitor the operation of the components. The controllers may communicate via one or more in-vehicle networks, including, but not limited to, one or more of a vehicle controller area network (CAN), an Ethernet network, or a media oriented system transfer (MOST), as some examples.

Figure 2:
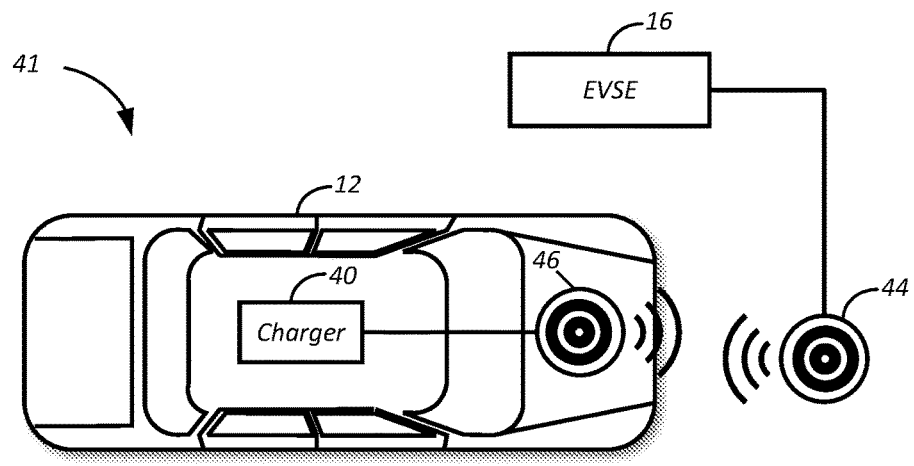
FIG. 2 is a block diagram illustrating a vehicle wireless charging system.

FIG. 2 illustrates an example wireless charging system 41 for the traction battery 14 of the vehicle 12. In one instance, the EVSE 16 may be electrically connected to and configured to power a primary (hereinafter, transmitter) coil 44. In such an instance, passing alternating current through the transmitter coil 44 may cause the transmitter coil 44 to emit energy such as electromagnetic energy. Energy emitted by the transmitter coil 44 may induce current in a secondary (hereinafter, receiver) coil 46 of the vehicle 12 when the receiver coil 46 is positioned within a predefined distance threshold of the transmitter coil 44. The receiver coil 46 may be electrically connected to and powered by the charger 40 of the vehicle 12. In one example, the receiver coil 46 may be configured to transmit a signal to the charger 40 in response to detecting that the transmitter coil 44 of the EVSE 16 capable of providing wireless charging is available within a predefined distance. The receiver coil 46 may, for instance, detect a proximity of the transmitter coil 44 based on a magnitude of current induced in the receiver coil 46 by the transmitter coil 44.

In one example, the transmitter coil 44 and the receiver coil 46 may be positioned inside inductive charge plates (not shown) of the EVSE 16 and the vehicle 12, respectively. As will be described in further detail in reference to FIG. 3, the vehicle 12 may further include an AC/DC converter configured to rectify and filter the AC input received from the EVSE 16 into DC output that may be used to charge the traction battery 14. The transmitter coil 44 of the EVSE 16 may be positioned in one of a variety of locations with respect to the vehicle 12, such as, but not limited to, underneath, in front of, behind, to a left or right side, above and so on. The transmitter coil 44 and/or the inductive charge plate of the EVSE 16 may be aligned with respect to each other or with respect to the receiver coil 46 of the vehicle 12 to create a suitable gap to facilitate energy transfer to the vehicle 12.

In one example, the receiver coil 46 of the vehicle 12 may be positioned in one of a variety of locations on the vehicle 12, such as, but not limited to, underside, roof, front or rear bumper, and so on. In another example, the transmitter coil 44 and the receiver coil 46 may be positioned in a variety of spatial configurations with respect to each other, as well as, their corresponding inductive charge plates, such as, but not limited to, horizontal, vertical, offset by a predefined angle in one or more spatial dimensions, and so on.

Prior to initiating an energy transfer from the EVSE 16, the vehicle 12 may be configured to change positions with respect to the EVSE 16 in response to a predefined signal, such as in response to a signal from the receiver coil 46 that the transmitter coil 44 of the EVSE 16 capable of providing wireless charging is available within a predefined distance. In one example, the vehicle 12, e.g., via one or more commands issued by the charger 40, may be configured to change relative position of (or align) the vehicle 12 with respect to the EVSE 16 such that a coupling coefficient k between the receiver coil 46 and the transmitter coil 44 is greater than a coefficient threshold, where the coupling coefficient k is a ratio of an actual mutual inductance of the coils 44, 46 to a maximum possible inductance of the coils 44, 46.

The coupling coefficient k may be a fractional value between 0 and 1, where 0 indicates no inductive coupling and 1 indicates full or maximum inductive coupling. In one example, the coupling coefficient k having a value greater than 0.5 may be indicative of a tight coupling between the transmitter and the receiver coils 44, 46 and the coupling coefficient k having a value less than 0.5 may be indicative of a loose coupling between the transmitter and the receiver coils 44, 46. The coupling coefficient k between a given set of transmitter and receiver coils 44, 46 may be a function of, for example, but not limited to, geometry, material, inductance, and other properties and characteristics associated with each of the transmitter and receiver coils 44, 46.

The charger 40 of vehicle 12 may be configured to initiate an alignment procedure of the vehicle 12 with respect to the EVSE 16 in response to receiving a signal from the EVSE 16 indicating that wireless charging is available. The charger 40 may be configured to initiate the alignment procedure of the vehicle 12 by transmitting a signal to one or more controllers (not shown) of the vehicle 12 configured to change position of the vehicle 12 to a predefined position.

A magnitude of an oscillating magnetic field generated by the transmitter coil 44 in response to the EVSE 16 circulating alternating current through the transmitter coil 44 may be proportional to an amount of the circulated current. The magnitude of the magnetic field B along the transmitter coil 44 may be measured in units of tesla (T) and may be expressed using Equation (1):

$$B = \frac{\mu_0 I N}{l} = \mu_0 I n, \quad (1)$$

where $\mu_0$ may represent permeability of free space, I is electric current, N may represent a total number of turns of wire in the transmitter coil 44, l may represent a length of the transmitter coil 44, and n may represent a number of turns of wire per unit length of the transmitter coil 44.

A magnitude of an electric field E generated as a result of the oscillating magnetic field may be expressed using Equation (2):

$$E = \frac{k_c Q}{d^2}, \quad (2)$$

where $k_c$ is a proportionality (or Coulomb's law) constant associated with a medium, e.g., air, surrounding the coils, Q may represent a quantity of charge in units of Coulombs (C), and d may represent a distance between the transmitter coil 44 and the receiver coil 46.

Oscillating electric and magnetic fields may, in one example, generate electromagnetic waves that may be characterized using frequency and/or wavelength. Magnitude of the oscillating electric and magnetic fields may further be proportional to frequency and/or wavelength of the generated electromagnetic waves. In one instance, the EVSE 16 may be configured to control the amount of current circulated in the transmitter coil 44 such that frequency and/or wavelength of electromagnetic waves generated by the oscillating electromagnetic fields is less than a frequency threshold and a wavelength threshold, respectively. In another example, the EVSE 16 may be configured to control the amount of current circulated in the transmitter coil 44 such that magnitude of the generated electric and/or magnetic fields has a predefined magnitude.

Figure 3:
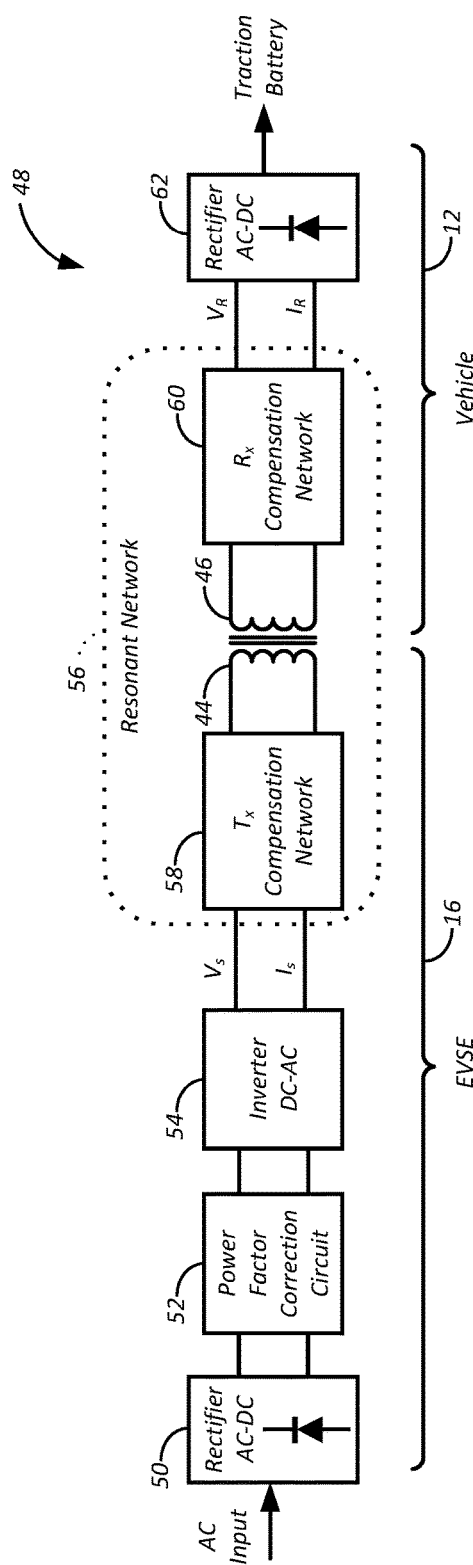
FIG. 3 is a block diagram illustrating electric power conditioning during wireless charging.

In reference to FIG. 3, an example wireless charging system 48 for charging the traction battery 14 of the vehicle 12 using wireless charging is shown. The EVSE 16 may be configured to power, e.g., circulate a predefined amount of current through, the transmitter coil 44 using one or more electrical or electronic systems, sub-systems, digital and/or analog circuit components, and so on. In one example, the EVSE 16 may include an EVSE rectifier 50, a power factor correction (PFC) circuit 52, a DC-AC inverter 54, and a primary side compensation network (hereinafter, transmitter compensation network) 58.

The EVSE rectifier 50 may be configured to convert received AC, such as AC supplied by a power grid or another power source, to DC. The PFC circuit 52 may comprise a DC-DC converter configured to step-up (or boost) DC input received from the EVSE rectifier 50 to a predefined DC output. In one example, the PFC circuit 52 may further include a bulk capacitor serving as an EMI filter that, together with the DC-DC converter, may be configured to improve power factor and/or reduce harmonic content that may be introduced into the input power by the EVSE rectifier 50. Output of the PFC circuit 52, i.e., a constant voltage, may serve as an input to the DC-AC inverter 54. The DC-AC inverter 54 may be a bridge inverter configured to convert DC output of the PFC circuit 52 to AC waveform having a predefined frequency. The DC-AC inverter 54 may generate a high frequency AC waveform.

A resonant network 56 may include a primary (hereinafter, transmitter) compensation network 58 and a secondary (hereinafter, receiver) compensation network 60, each coupled with the transmitter and receiver coils 44, 46, respectively. The resonant network 56 may be configured to enhance power transfer efficiency between the EVSE 16 and the vehicle 12 by creating magnetic resonance between the transmitter and receiver coils 44, 46. In one example, each of the transmitter and receiver compensation networks 58, 60 may define one or more reactive components, such as, but not limited to, inductors and capacitors. Resonant capacitors in the transmitter and receiver compensation networks 58, 60 may, for instance, compensate for magnetizing and/or stray inductance losses.

Output of the transmitter compensation network 58 may be configured to energize (or power) the transmitter coil 44 such that the transmitter coil 44 generates an oscillating magnetic field having a predefined magnitude. The voltage or energy output by the transmitter coil 44, e.g., via an oscillating magnetic field, may induce current in the receiver coil 46 of the vehicle 12. The receiver coil 46 may provide input for the receiver compensation network 60.

A vehicle power rectifier 62 may be configured to convert AC output of the receiver compensation network 60 to DC output compatible with the traction battery 14. The system 48 may further include a vehicle electromagnetic interference (EMI) filter (not shown) defining one or more active and/or passive components arranged to reduce current ripple generated by the vehicle power rectifier 62 and whose output power is directed to charge the traction battery 14.

Figure 4:
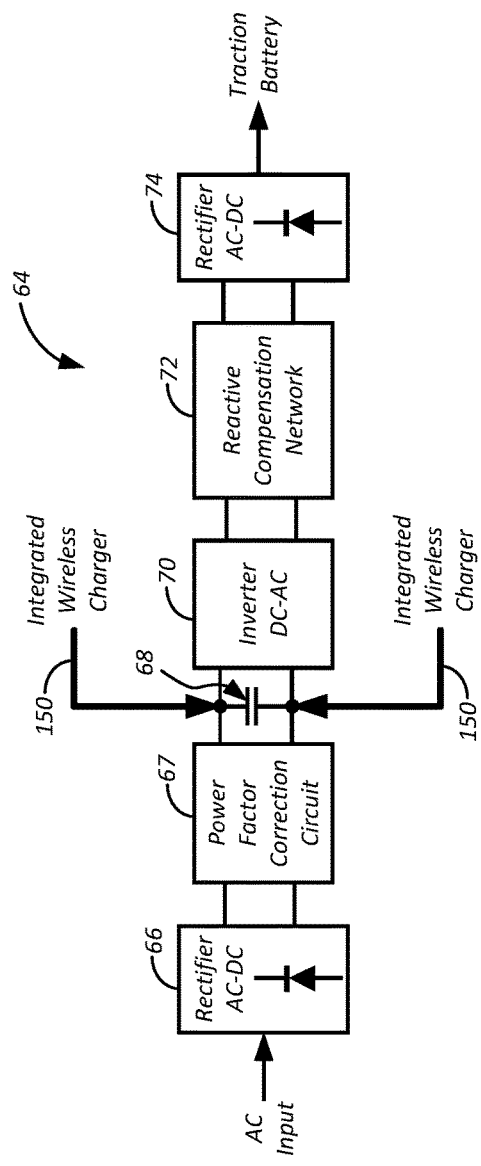
FIG. 4 is a block diagram illustrating electric power conditioning during plug-in charging.

In reference to FIG. 4, an example vehicle on-board charger 64 for charging the traction battery 14 using energy received via the charge port 18 is shown. The on-board charger 64 may be configured to convert AC energy to DC energy suitable for charging the traction battery 14. In one example, the charger 40 may be configured to control one or more power (conditioning and/or conversion) stages of the on-board charger 64 to enable energy transfer to the traction battery 14. In response to detecting, for example, that the vehicle 12 has been connected to the EVSE 16, the charger 40 may transmit a signal to the battery controller 38 indicative of a request to charge the traction battery 14. The battery controller 38 may then command the BEC 36 to open or close one or more switches, e.g., the positive and negative main contactors, enabling the transfer of electric energy between the EVSE 16 and the traction battery 14. As described in further detail in reference to FIG. 7, one or more power stages of the charger 40 may be represented using active and/or passive electrical circuit components, programmable devices, or other implements.

The on-board charger 64 may include a vehicle power rectifier 66 that converts, or rectifies, the AC power supplied by an AC power source, such as the EVSE 16, the power grid, and so on, to DC power. The on-board charger 64 may include a PFC circuit 67 that operates to improve power factor and/or reduce harmonic content that may be introduced into the input power by DC output of the rectifier 66, such as by using an interleaved PFC circuit described in reference to FIG. 7. In one example, a power factor of an electrical circuit may be a ratio expressing relative relationship of real, or true, power used by the circuit to do work and apparent power supplied to the circuit. In another example, a value of the power factor may range between zero (0) for a purely inductive load and one (1) for a purely resistive load.

An energy storage capacitor 68 may be configured to receive output of the PFC circuit 67 and transfer charge current for the traction battery 14. The energy storage capacitor 68 may be a bulk capacitor, a DC link capacitor, and so on, and may be sized to transfer sufficient power for the traction battery 14 at a time when a supply voltage signal is less than predefined threshold, e.g., such that voltage across the traction battery 14 does not vary during zero crossing. Voltage of the energy storage capacitor 68 as received from the PFC circuit 67 may be substantially constant, e.g., not varying with respect to time. A DC-AC inverter 70 may invert output of the energy storage capacitor 68 from DC to AC, such that it may be processed by one or more transformers of a reactive compensation network 72.

The reactive compensation network 72 may be configured to transfer energy output by the DC-AC inverter 70 to the traction battery 14 while providing galvanic isolation between the AC power source and the traction battery 14. A rectifier 74 may be configured to receive AC output of the reactive compensation network 72 and to convert to DC for transferring to the traction battery 14. It should be noted that the on-board charger 64 and the associated power stages are merely examples, and other arrangements or combinations of elements, stages, and components may be used. While the DC-AC inverter 70, the reactive compensation network 72 and the rectifier 74 are illustrated as separate stages, in some examples, the blocks 70, 72, and 74 and their functions may be designated generally as a DC-DC converter.

Figure 5A:
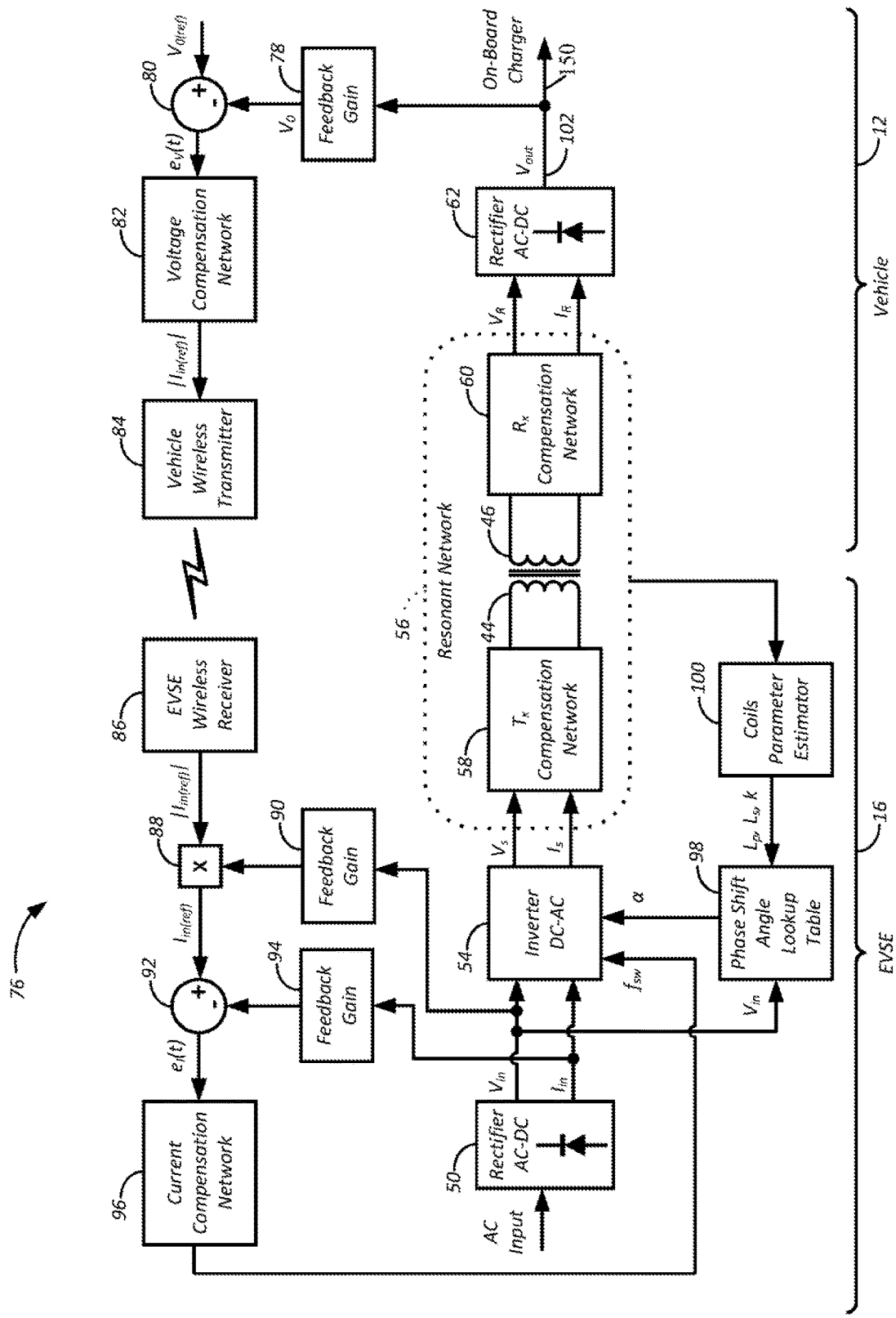
FIGS. 5A-5B are block diagrams illustrating electric power conditioning in an integrated wireless charging system.
Figure 5B:
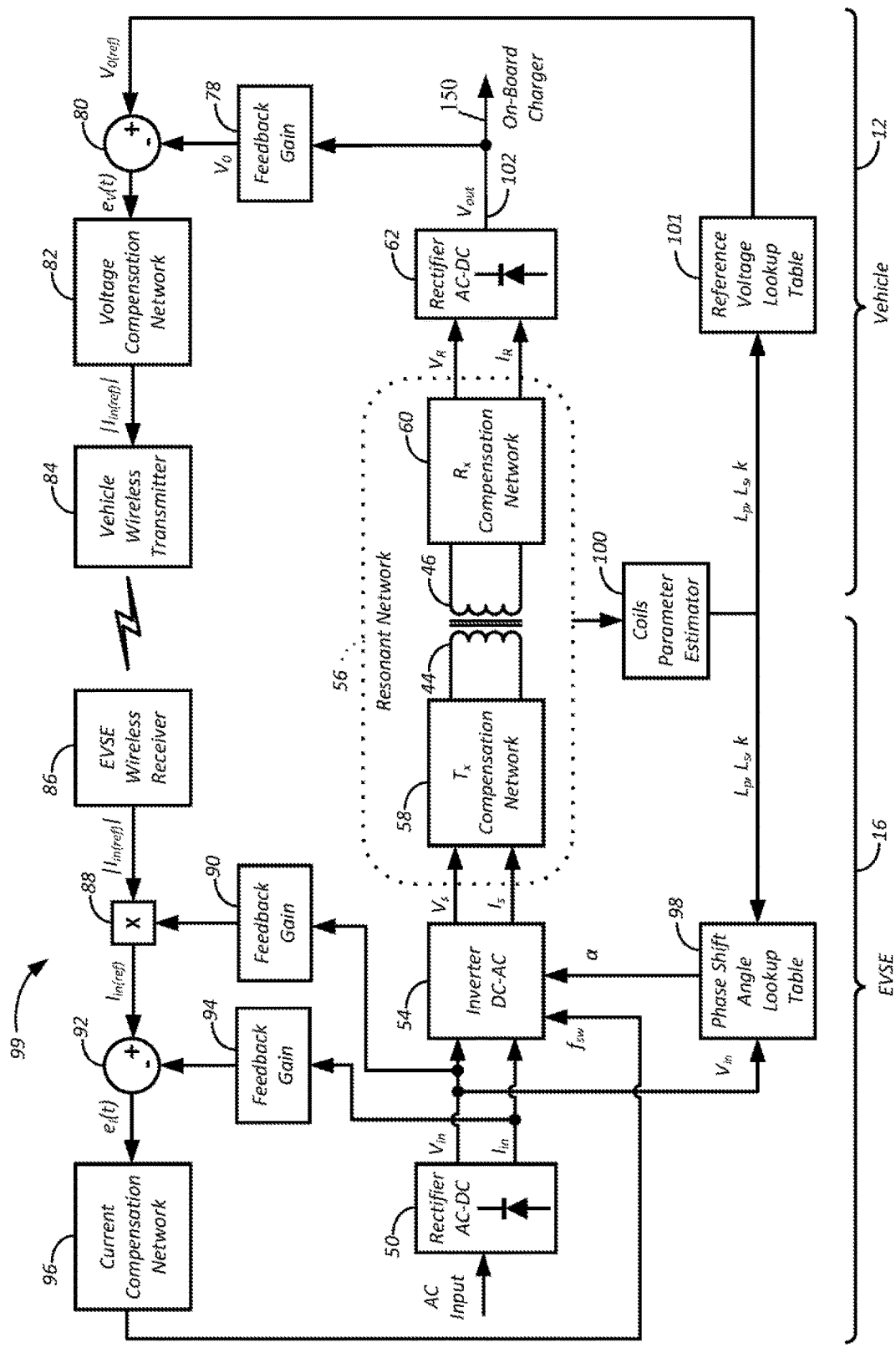

As described in further detail in reference to FIGS. 5A-5B, the on-board charger 64 may be further configured to receive power transfer from an integrated wireless charging system. In one example, the integrated wireless charging system may be configured to connect 150 to the on-board charger 64 of the vehicle 12 at the energy storage capacitor 68. Additionally or alternatively, the integrated wireless charging system connected to the on-board charger 64 of the vehicle 12 may lack a power factor correction circuitry between the energy storage capacitor 68 and rectified mains line voltage and current output by the EVSE rectifier.

FIG. 5A illustrates an example integrated wireless charging system 76 configured to transfer electric charge current for the traction battery 14 of the vehicle 12 using wireless energy transfer over an air gap, e.g., via magnetically coupled transmitter and receiver coils 44, 46. The integrated wireless charging system 76 may lack the PFC circuit 52 of the exemplary wireless charging system 48. Stated another way, the integrated wireless charging system 76 may lack the power factor correction circuitry between the connection 150 to the energy storage capacitor 68 and output of the EVSE rectifier 50. In addition to one or more components described in reference to the example wireless charger 48 of FIG. 3, the integrated wireless charging system 76 includes feedback gains 78, 90, 94, a voltage compensation network 82, a current compensation network 96, a vehicle wireless transmitter 84, an EVSE wireless receiver 86, summing points 80, 92, and a multiplication point 88. It is understood that, in some examples, the integrated wireless charging system 76 may include more or fewer control stages and/or differently connected control stages from those illustrated in FIG. 5A.

The integrated wireless charging system 76 may be configured to generate signal indicative of output voltage $V_{out}$ 102 for charging the traction battery 14. In one example, output of the integrated wireless charging system 76 connects (indicated generally by arrows 150, as described in reference to FIG. 4) to the energy storage capacitor 68 of the on-board charger 64 configured to transfer charge voltage and/or charge current for the traction battery 14. The integrated wireless charging system 76 may be further configured to cause the DC-AC inverter 54 to operate to drive toward unity power factor under given load conditions and/or mains line conditions, such as, but not limited to, by causing the DC-AC inverter 54 to operate to drive voltage of the energy storage capacitor 68 toward a constant value, to operate to drive a phase of the input current $I_{in}$ toward a phase of the input voltage $V_{in}$, and so on.

The DC-AC inverter 54 of the EVSE 16 may be configured to receive rectified AC (mains) line input voltage $V_{in}$ and rectified mains line input current $I_{in}$ from the EVSE rectifier 50. The source voltage $V_S$ and source current $I_S$ output by the DC-AC inverter 54 may power the components of the resonant network 56, such as, but not limited to, the components of the resonant network 56 described in reference to FIG. 3—the transmitter compensation network 58, the transmitter and receiver coils 44, 46, and the receiver compensation network 60. In one example, the resonant network 56 may be configured to use the receiver compensation network 60 of the vehicle 12 to output one or more signals indicative of receiver voltage $V_R$ and receiver current $I_R$. The vehicle power rectifier 62 may then convert the AC output of the resonant network 56 to DC input compatible with the traction battery 14. The vehicle power rectifier 62 may generate a signal indicative of charge voltage data (hereinafter, output voltage $V_{out}$ 102) for transfer to the energy storage capacitor 68 of the on-board charger 64. In one example, the integrated wireless charging system 76 may be configured to alter a switching frequency $f_{sw}$ of the DC-AC inverter 54 to cause the DC-AC inverter 54 to operate to drive output voltage $V_{out}$ 102 of the energy storage capacitor 68 toward a constant value.

The DC-AC inverter 54 may comprise one or more switching components and the control logic of the EVSE 16 may be configured to operate or otherwise control the switching components of the DC-AC inverter 54 according to a predefined switching frequency $f_{sw}$. In one example, the control logic of the EVSE 16 may be configured to alter the switching frequency $f_{sw}$ of the switching components of the DC-AC inverter 54 to drive toward unity power factor under given load conditions and/or mains line conditions.

In one example, the control logic of the EVSE 16 may be configured to alter the switching frequency $f_{sw}$ of the DC-AC inverter 54 to drive a voltage, e.g., output voltage $V_{out}$ 102, of the energy storage capacitor 68 of the on-board charger 64 toward a constant value. In another example, the control logic of the EVSE 16 may be further configured to alter the switching frequency $f_{sw}$ of the DC-AC inverter 54 to synchronize rectified mains line input voltage $V_{in}$ and rectified mains line input current $I_{in}$, such as to cause the DC-AC inverter 54 to operate to drive a phase of the rectified mains line input current $I_{in}$ toward a phase of the rectified main line input voltage $V_{in}$. As described below in further detail, the control logic of the EVSE 16 may be configured to alter the switching frequency $f_{sw}$ of the switching components of the DC-AC inverter 54 based on one or more parameters associated with the vehicle 12, such as, but not limited to, charge voltage data received from the vehicle 12.

The control logic of the EVSE 16 may be configured to alter the switching frequency $f_{sw}$ of the DC-AC inverter 54 according to a switching frequency $f_{sw}$ derived using a feedback control. The control logic circuit of the EVSE 16 is in communication with the charger 40 of the vehicle 12 and may be configured to receive one or more signals indicative of a reference signal defining the switching frequency $f_{sw}$.

The charger 40 of the vehicle 12 may be configured to determine the magnitude of a reference input current $|I_{in(ref)}|$ based on the output voltage $V_{out}$ 102 detected at the output of the vehicle power rectifier 62 of the vehicle 12. The charger 40 may then transmit the magnitude of a reference input current $|I_{in(ref)}|$ to the vehicle 12. In one example, the charger 40 uses the summing point 80 to determine a voltage error $e_V(t)$ between the output voltage $V_{out}$ 102 and a reference capacitor voltage $V_{o(ref)}$ generated for the energy storage capacitor 68. In some instances, the charger 40 may determine a voltage error $e_V(t)$ by determining a difference between the output voltage $V_{out}$ 102 and a reference capacitor voltage $V_{o(ref)}$. The reference capacitor voltage $V_{o(ref)}$ may be voltage measured across the energy storage capacitor 68 of the on-board charger 64. The reference capacitor voltage $V_{o(ref)}$ may further be voltage generated by the charger 40 for the energy storage capacitor 68 of the on-board charger 64. As will be described in reference to FIG. 5B, the reference capacitor voltage $V_{o(ref)}$ may be defined from one or more operating parameters associated with the resonant network 56 between the EVSE 16 and the vehicle 12. In one example, the charger 40 may be configured to determine the reference capacitor voltage $V_{o(ref)}$ based on one or more of a transmitter coil inductance, a receiver coil inductance, and a coupling coefficient.

The voltage error $e_V(t)$ output by the summing point 80 may serve as input to the voltage compensation network 82 configured to generate the magnitude of a reference input current $|I_{in(ref)}|$. The voltage compensation network 82 may be further configured to use a wireless transmitter 84 of the vehicle 12 to transmit the magnitude of a reference input current $|I_{in(ref)}|$ to the EVSE 16. In one example, the wireless transmitter 84 may transmit to the wireless receiver 86 a signal indicative of the magnitude of a reference input current $|I_{in(ref)}|$. While in some examples the wireless transmitter 84 may be configured to repeatedly broadcast a signal indicative of the magnitude of the reference input current $|I_{in(ref)}|$ for receipt by the wireless receiver 86 of the EVSE 16, it is also contemplated that the wireless transmitter 84 may be configured to transmit the magnitude of the reference input current $|I_{in(ref)}|$ to the EVSE 16 responsive to a corresponding request from the EVSE 16.

The charger 40 of the vehicle 12 may use a wireless transmitter 84 to transmit to the EVSE 16 a reference signal, e.g., a signal indicative of a magnitude of a reference input current $|I_{in(ref)}|$. In some instances, the charger 40 of the vehicle 12 may transmit to the EVSE 16 a signal indicative of the magnitude of a reference input current $|I_{in(ref)}|$ responsive to detecting output voltage $V_{out}$ 102 at the output of the vehicle power rectifier 62 of the vehicle 12. A signal indicative of the magnitude of a reference input current $|I_{in(ref)}|$ may be a direct current (DC) signal, e.g., a signal that is constant over a predefined period of time and/or does not vary as a function of time, and may be representative of a magnitude of rectified mains line current received by the DC-AC inverter 54. In one example, a change in the magnitude of a reference input current $|I_{in(ref)}|$ may correspond to a change in an amount of charge power requested by the charger 40 for the traction battery 14, e.g., an increase in charge power requested by the charger 40 may cause the magnitude of a reference input current $|I_{in(ref)}|$ to increase and so on.

A wireless receiver 86 of the EVSE 16 may be connected with the control logic of the EVSE 16 and may be configured to receive a signal from the vehicle 12 indicative of the magnitude of a reference input current $|I_{in(ref)}|$. The control logic of the EVSE 16 may be further configured to alter the switching frequency $f_{sw}$ of the DC-AC inverter 54 using the received magnitude of a reference input current $|I_{in(ref)}|$ to cause the DC-AC inverter 54 to operate to drive a voltage of the energy storage capacitor 68 of the on-board battery charger 64 of the vehicle 12 toward a constant value.

The control logic of the EVSE 16 may be further configured to use the received magnitude of a reference input current $|I_{in(ref)}|$ to cause the DC-AC inverter 54 to operate to drive a phase of the rectified mains line current toward a phase of the rectified mains line voltage. In one example, the control logic of the EVSE 16 may be configured to multiply, e.g., at the multiplication point 88, the received magnitude of a reference input current $|I_{in(ref)}|$ by a value of the rectified mains line input voltage $V_{in}$ supplied to the input of the DC-AC inverter 54. The rectified mains line input voltage $V_{in}$ may, in some instances, be scaled or amplified using the feedback gain 90 prior to the multiplication with the received magnitude of a reference input current $|I_{in(ref)}|$. In some instances, output of the multiplication point 88 may be a signal indicative of a time-varying reference input current $I_{in(ref)}$.

The control logic of the EVSE 16 may be further configured to determine an error $e_I(t)$ between the time-varying reference input current $I_{in(ref)}$ output by the multiplication point 88 and the rectified mains line input current $I_{in}$ received at the input to the DC-AC inverter 54. In one example, the control logic of the EVSE 16 may determine, e.g., at the summing point 92, a difference between the rectified mains line input current $I_{in}$ and the time-varying reference input current $I_{in(ref)}$. In one example, the rectified mains line input current $I_{in}$ may be scaled, e.g., amplified, using the feedback gain 94 prior to the determination of a difference between the rectified mains line input current $I_{in(ref)}$ and reference input current $I_{in}$.

The current compensation network 96 may be configured to generate a frequency command based on a current error $e_f(t)$ output by the summing point 92. The control logic of the EVSE 16 may be configured to use the frequency command to define the switching frequency $f_{sw}$, which to apply to the DC-AC inverter 54. The control logic of the EVSE 16 may therefore alter a switching frequency $f_{sw}$ of the DC-AC inverter 54 to a switching frequency $f_{sw}$ determined from a frequency command output by the current compensation network 96. In one example, the control logic of the EVSE 16 alters switching frequency $f_{sw}$ applied to the switching components of the DC-AC inverter 54 to a switching frequency $f_{sw}$ determined from a frequency command received from the compensation network 96. In some instances, the altering of the switching frequency $f_{sw}$ may cause to drive a value of the current error $e_f(t)$ output by the summing point 92 toward zero.

The control logic of the EVSE 16 may be further configured to operate the switching components of the DC-AC inverter 54 according to a predefined phase shift angle α. In one example, the control logic may alter the phase shift angle α of the DC-AC inverter 54 to limit the altering of the switching frequency $f_{sw}$ to specified band of frequencies. The control logic of the EVSE 16 may, for instance, alter the phase shift angle α of the DC-AC inverter 54 to limit the altering of the switching frequencies $f_{sw}$ to a range of frequencies of 81.3-90 kHz, however, other frequency ranges, values, and bands are also contemplated. As described below in further detail, the control logic of the EVSE 16 may be configured to alter the phase shift angle α of the DC-AC inverter 54 based on rectified mains line voltage $V_{in}$ and one or more operating parameters associated with the resonant network 56 between the EVSE 16 and the vehicle 12. The parameters associated with the resonant network 56 may be parameters, such as, but not limited to, transmitter coil inductance, receiver coil inductance, coupling coefficient and so on.

The control logic of the EVSE 16, for example, may be configured to receive as input one or more signals from a plurality of sensors (not shown), such as, but not limited to, voltage sensors, current sensors, and the like, indicative of one or more operating parameters associated with the resonant network 56. The control logic may include a coils parameter estimator 100 configured to output, e.g., based on input from the plurality of sensors of the resonant network 56, one or more signals indicative of a coupling coefficient k between the transmitter and receiver coils 44, 46, transmitter coil inductance $L_p$, and receiver coil inductance $L_s$. While the coils parameter estimator 100 is described as being a part of the EVSE 16, it is understood that, in some examples, the coils parameter estimator 100 and its functions may wholly or partly reside with the vehicle 12. Furthermore, while the coils parameter estimator 100 is described as transmitting signals indicative of a coupling coefficient k, transmitter coil inductance $L_p$, and receiver coil inductance $L_s$, in some examples, the coils parameter estimator 100 may additionally or alternatively transmit other operating parameters associated with the resonant network 56, whether computed, sensor-indicated, or based on a combination thereof.

Responsive to a signal from the coils parameter estimator 100, the control logic of the EVSE 16 may query a phase shift angle lookup table 98 to determine a phase shift angle α that corresponds to a combination of the rectified mains line voltage $V_{in}$ and one or more of the received operating parameters associated with the resonant network 56. The phase shift angle lookup table 98 may include a plurality of phase shift angles α, each corresponding to a combination of the rectified mains line voltage $V_{in}$ and one or more of a plurality of coupling coefficients k, transmitter coil inductances $L_p$, and receiver coil inductances $L_s$. Altering the phase shift α of the DC-AC inverter 54 based on the phase shift angle lookup table 98 may cause the DC-AC inverter 54 to limit the altering of the switching frequency $f_{sw}$ to a specified band (range) of frequencies. The control logic of the EVSE 16 may alter the phase shift angle α of the DC-AC inverter 54 according to a phase shift angle α resulting from the phase shift angle lookup table 98. The altering of the phase shift angle α of the DC-AC inverter 54 may cause the DC-AC inverter 54 to limit the altering of the switching frequency $f_{sw}$ to a specified band of frequencies, e.g., cause the DC-AC inverter 54 to limit the altering of the switching frequencies $f_{sw}$ to a range of frequencies of 81.3-90 kHz.

In some examples, the DC-AC inverter 54 may include two pairs of switching components, each pair further including a master switching component (master switches) and a complementary switching component (complementary switch). The control logic of the EVSE 16 may be configured to alter a switching frequency $f_{sw}$ and/or alter a phase shift angle α of the DC-AC inverter 54 by issuing a command to open or close one or more of the master switches. The complementary switching component may each define a switch configured to, in response to the corresponding master switching component changing between an open state and a closed state, change to a state that is opposite (complement) of a state of the corresponding master switching component.

The control logic of the EVSE 16 may be configured to alter a switching frequency $f_{sw}$ and/or alter the phase shift angle of the DC-AC inverter 54 by issuing a command to open or close one or more of the master switches in response to voltage of the master switch being less than a predefined voltage threshold. In one example, the control logic of the EVSE 16 may command a first master switch to open and, in response to voltage of the first master switch being less than a predefined voltage threshold following the open command, command a second master switch to close. The control logic, for instance, may issue the close command to the second master switch in response to voltage of the first master switch following the open command being less than 20% of the voltage measured across the first switch at a time of the issuance of the open command.

The control logic of the EVSE 16 may be configured to alter a switching frequency $f_{sw}$ and/or alter the phase shift angle of the DC-AC inverter 54 by issuing a command to open or close one or more of the master switches in response to current of the master switch being less than a predefined current threshold. In one example, the control logic of the EVSE 16 may command a first master switch to close and, in response to current of the first master switch being less than a predefined current threshold following the close command, command a second master switch to open. The control logic, for instance, may issue the open command to the second master switch in response to current of the first master switch following the close command being less than 20% of the current measured across the first switch at a time of the issuance of the close command.

FIG. 5B illustrates an exemplary system 99 for determining the reference capacitor voltage $V_{0(ref)}$. The system 99 may include the charger 40 of the vehicle 12 that is configured to determine the reference capacitor voltage $V_{0(ref)}$ based on one or more operating parameters associated with the resonant network 56 between the EVSE 16 and the vehicle 12. In one example, the charger 40 may be configured to query a reference voltage lookup table 101 to determine the reference capacitor voltage $V_{0(ref)}$ that corresponds to one or more of the received operating parameters associated with the resonant network 56. The reference voltage lookup table 101 may include reference capacitor voltages $V_{0(ref)}$, each corresponding to one or more of a plurality of coupling coefficients k, transmitter coil inductances $L_p$, and receiver coil inductances $L_s$. Altering a switching frequency $f_{sw}$ of the DC-AC inverter 54 based on a reference capacitor voltage $V_{0(ref)}$ resulting from one or more operating parameters associated with the resonant network 56 may cause the DC-AC inverter 54 to operate to drive a voltage of the energy storage capacitor 68 of the on-board battery charger 64 of the vehicle 12 toward a constant value.

Figure 6:
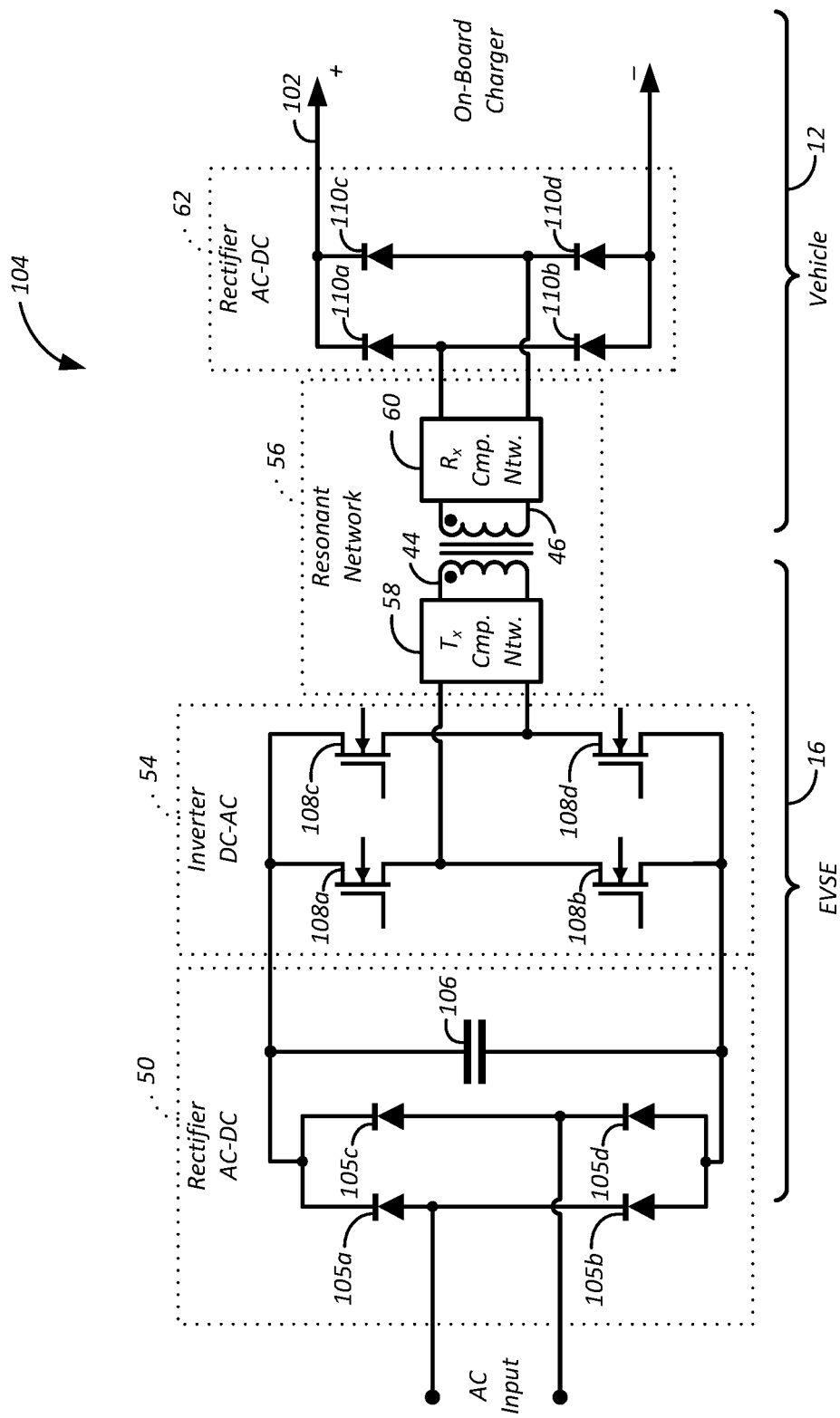
FIG. 6 is a circuit diagram illustrating a wireless portion of the integrated charging system.

In reference to FIG. 6, an example circuit diagram 104 illustrating an integrated wireless charger for a vehicle 12 is shown. The EVSE 16 receives AC mains line electrical energy from a power source, such as, but not limited to, a utility power generator, and so on. The EVSE rectifier 50 may include a plurality of diodes 105a-d and may be configured to rectify, i.e., convert, AC input voltage received from the AC power source into DC output voltage for charging the traction battery 14. In one example, the diodes 105a-d may be connected in series pairs such that during a positive half-cycle of the varying input voltage the diodes 105b and 105c are conducting while the diodes 105a and 105d are reverse biased and during a negative half-cycle the diodes 105a and 105d are conducting and the diodes 105b and 105c are reverse biased. In some instances, the EVSE rectifier 50 may further include a filtering capacitor 106 configured to smooth output signal generated by the diodes 105a-d.

Rectified mains line voltage and current signals output of the EVSE rectifier 50 may serve as input to the DC-AC inverter 54, as described, for example, in reference to FIG. 5A. The DC-AC inverter 54 comprises a plurality of high-frequency switches 108a-d. The switches 108a-d may be semiconductor devices, e.g., metal-oxide semiconductor field-effect transistor (MOSFET), insulated gate bipolar transistors (IGBT), bipolar junction transistor (BJT), and so on, arranged in a full-bridge configuration. The control logic of the EVSE 16 may be configured to alter a switching frequency $f_{sw}$ of the switches 108a-d to cause the DC-AC inverter 54 to drive a voltage, e.g., output voltage $V_{out}$ 102, of the energy storage capacitor 68 of the on-board charger 64 toward a constant value. The control logic of the EVSE 16 may be further configured to alter the switching frequency $f_{sw}$ of the switches 108a-d to synchronize rectified mains line input voltage $V_{in}$ and rectified mains line input current $I_{in}$, such as to cause the DC-AC inverter 54 to operate to drive a phase of the rectified mains line input current $I_{in}$ toward a phase of the rectified main line input voltage $V_{in}$.

The control logic of the EVSE 16 may be still further configured to alter the switching frequency $f_{sw}$ of the switches 108a-d based on one or more parameters associated with the vehicle 12, such as, but not limited to, charge voltage data received from the vehicle 12. The charge voltage data may be output voltage $V_{out}$ 102 previously output by the rectifier 62 of the vehicle 12 or data derived therefrom. The control logic of the EVSE 16 may be configured to alter the switching frequency $f_{sw}$ of the switches 108a-d based on the feedback loop as described, for example, in reference to at least FIG. 5A.

In another example, the control logic of the EVSE 16 may be configured to alter a phase shift angle α of the switches 108a-d based on rectified mains line voltage $V_{in}$ and one or more operating parameters associated with the resonant network 56, such as, but not limited to, transmitter coil inductance $L_p$, receiver coil inductance $L_s$, a coupling coefficient k, and so on. Altering the phase shift angle α of the switches 108a-d based on rectified mains line voltage $V_{in}$ and the operating parameters of the resonant network 56 may limit the altering of the switching frequency $f_{sw}$ to specified band (range) of frequencies. The DC-AC inverter 54 may be configured to output source voltage $V_S$ and source current $I_S$ that power the resonant network 56.

The resonant network 56 includes the transmitter compensation network 58 of the EVSE 16 arranged at the input to the transmitter coil 44 and the receiver compensation network 60 of the vehicle 12 arranged at the output of the receiver coil 46. The compensation networks 58, 60 may include a plurality of reactive components, e.g., inductors and/or capacitors, configured to maximize power transfer and/or maximize efficiency of power transfer between the EVSE 16 and the vehicle 12. In one example, the compensation networks 58, 60 may be impedance matching networks configured to match source impedance and input impedance.

The vehicle power rectifier 62 includes a plurality of rectifier diodes 110a-d arranged in a full-bridge configuration at the output of the receiver compensation network 60 of the resonant network 56. The rectifier diodes 110a-d may be configured to rectify, i.e., convert, the AC power output by the receiver compensation network 60 to DC input compatible with the traction battery 14. In some examples, the circuit 104 may further include an electromagnetic interference filter (not shown) defining, for instance, one or more inductors and capacitors arranged in a low-pass filter configuration and configured to reduce current ripple output by the rectifier diodes 110a-d.

Responsive to detecting output voltage $V_{out}$ 102 generated by the vehicle power rectifier 62, the charger 40 of the vehicle 12 may be configured to determine the magnitude of a reference input current $|I_{in(ref)}|$. The charger 40 may be further configured to transmit the magnitude of reference input current $|I_{in(ref)}|$ to the EVSE 16 using the wireless transmitter 84 of the vehicle 12, as described, for example, in reference to FIG. 5A.

Figure 7:
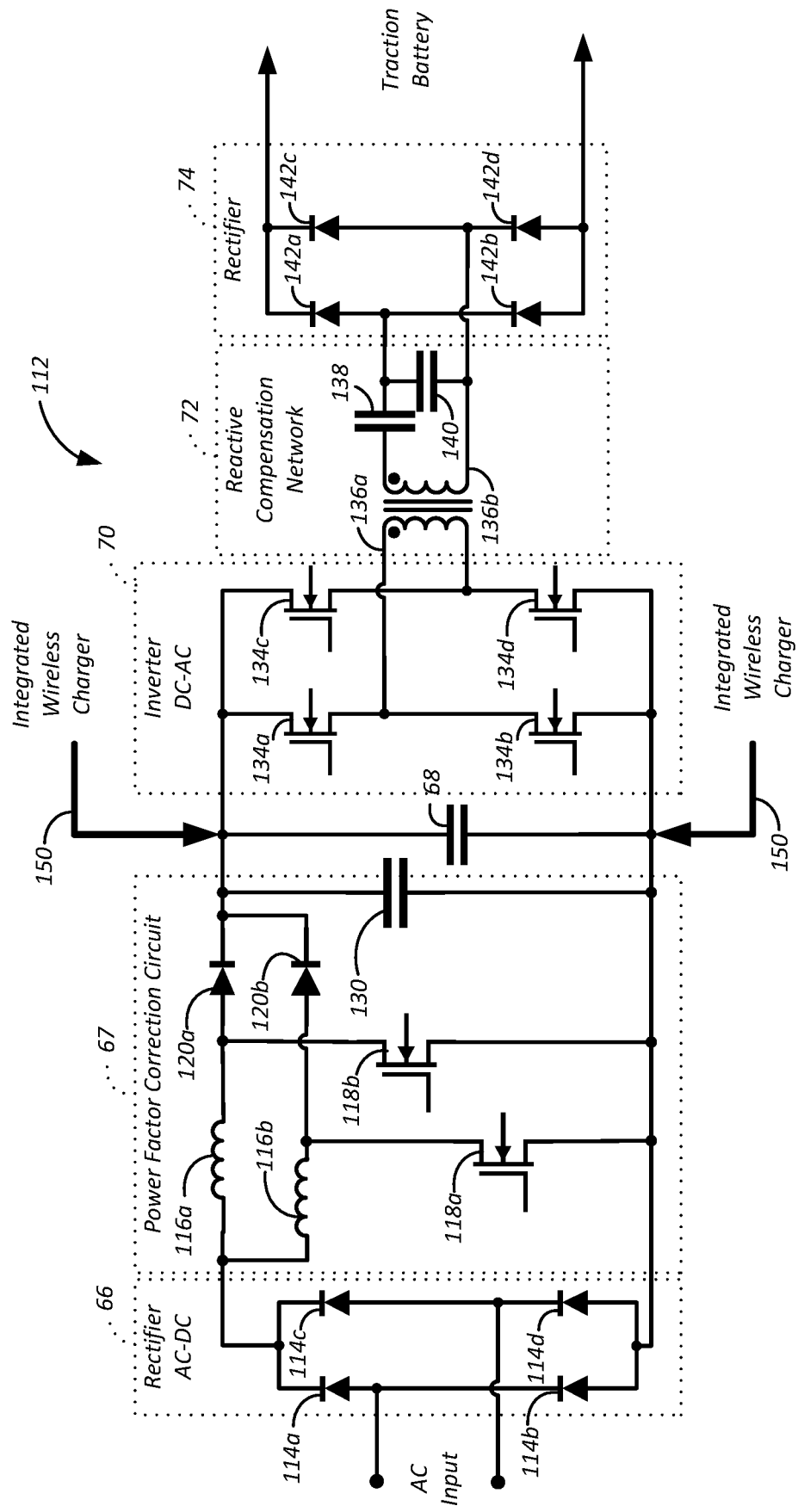
FIG. 7 is a circuit diagram illustrating an on-board charger portion of the integrated charging system.

Shown in FIG. 7 is an example circuit diagram 112 illustrating an integrated wireless charging system for the on-board charger of the vehicle 12. In one example, the circuit 112 may illustrate one or more power stages of the on-board charger 64 described in reference to FIG. 4. The circuit 112 receives electrical energy from an AC power source, for example, via the charge port 18 of the vehicle 12. While not illustrated in FIG. 7, the circuit 112 may include a pre-charge circuit having a pre-charge contactor connected in series with a pre-charge resistor and configured to control energizing process of one or more terminals of the traction battery 14. The pre-charge circuit may be electrically connected in parallel with a positive main contactor, such that when the pre-charge contactor is closed the positive main contactor may be opened and the negative main contactor may be closed enabling the electric energy to flow through the pre-charge circuit thus controlling an energizing process of the positive terminal of the traction battery 14.

The circuit 112 may include the vehicle power rectifier 66 configured to rectify, i.e., convert, low frequency AC input voltage received from the AC power source into DC output voltage for charging the traction battery 14. In one example, the rectifier 66 may include a plurality of diodes 114*a-d* connected in series pairs such that during a positive half cycle of the input voltage the diodes 114*b* and 114*c* are conducting while the diodes 114*a* and 114*d* are reverse biased and during a negative half cycle the diodes 114*a* and 114*d* are conducting and the diodes 114*b* and 114*c* are reverse biased.

The PFC circuit 67 of the circuit 112 may be configured to reduce input current harmonics, such as input current ripple amplitude, thereby improving a power factor and increasing efficiency of the charging process. In one example, the PFC circuit 67 is a two-cell interleaved boost converter. The PFC circuit 67 includes inductors 116*a-b*, high frequency switches 118*a-b*, and diodes 120*a-b*. The switches 118*a-b* may be one or more semiconductor switches, such as MOSFET, IGBT, BJT, and so on. In one example, the switches 118*a-b* may be N-channel depletion type MOSFETs.

When the switches 118*a-b* are in a closed position the electric energy flowing through a corresponding one of the inductors 116*a-b* generates a magnetic field causing the inductor to store energy. When the switches 118*a-b* are in an open position the corresponding one of the inductors 116*a-b* charges the filter capacitor 130 via a respective one of the diodes 120*a-b*. In one example, phase shifting the on and off commands issued to each of the switches 118*a-b* may reduce ripple in the output current of the inductors 116*a-b*.

The filter capacitor 130 provides electrical energy to a next power stage of the circuit 112 when one of the switches 118*a-b* is closed. In one example, a phase shift introduced between the on and off commands by the charger 40 to each of the switches 118*a-b* enables the filter capacitor 130 to produce a substantially constant output voltage for input to the energy storage capacitor 68. In their reverse-biased state at a time when a corresponding one of the switches is closed the diodes 120*a-b* slow a discharge of the energy storage capacitor 68.

The DC-AC inverter 70 may be configured to transfer power to a reactive compensation network 72 that provides galvanic isolation between the AC power source and the traction battery 14. The DC-AC inverter 70 comprises a capacitor 68 and a plurality of high-frequency switches 134*a-d*. The energy storage capacitor 68 may be connected 150 to an integrated wireless charger, such as an integrated wireless charger lacking a power factor correction circuitry between the energy storage capacitor 68 and mains line input to the EVSE rectifier 50, as described, for example, in reference to FIGS. 5A-5B and 6. Voltage of the energy storage capacitor 68 received from the integrated wireless charger may be substantially constant.

The plurality of switches 134*a-d*, e.g., MOSFETs, IGBTs, and/or BJTs, may be arranged in a full-bridge configuration on a primary side 136*a* of a transformer of the reactive compensation network 72. The charger 40 may be configured to command the plurality of high frequency switches 134*a-d* on and off, such that the switches 134*a*, 134*c* are switched at a predefined duty cycle and a predefined phase shift with respect to each other and the switches 134*b*, 134*d* are also switched at predefined duty cycle and a predefined phase shift with respect to each other and with respect to the switches 134*a*, 134*c*.

The reactive compensation network 72 further includes capacitors 138 and 140 arranged on a secondary side 136*b* of the transformer and configured to compensate harmonics and/or reactive power consumption of the transformer thereby providing resonance operation of the transformer with capacitance of the switches 134*a-d* and facilitating zero voltage switching (ZVS).

The rectifier 74 includes a plurality of rectifier diodes 142*a-d* arranged in a full-bridge configuration on a secondary side 100*b* of the transformer of the reactive compensation network 72. The rectifier diodes 142*a-d* may be configured to rectify, i.e., convert, the AC power output by the transformer to DC input compatible with the traction battery 14. Output of the rectifier 74 may, in one instance, be directed to the traction battery 14 of the vehicle 12. In some examples, prior to being directed to the traction battery 14 output of the rectifier 74 may be received at an EMI filter (not shown) defining one or more inductor and capacitor arranged in a low-pass filter configuration to reduce current ripple output by the rectifier diodes 142*a-d*.

Figure 8:
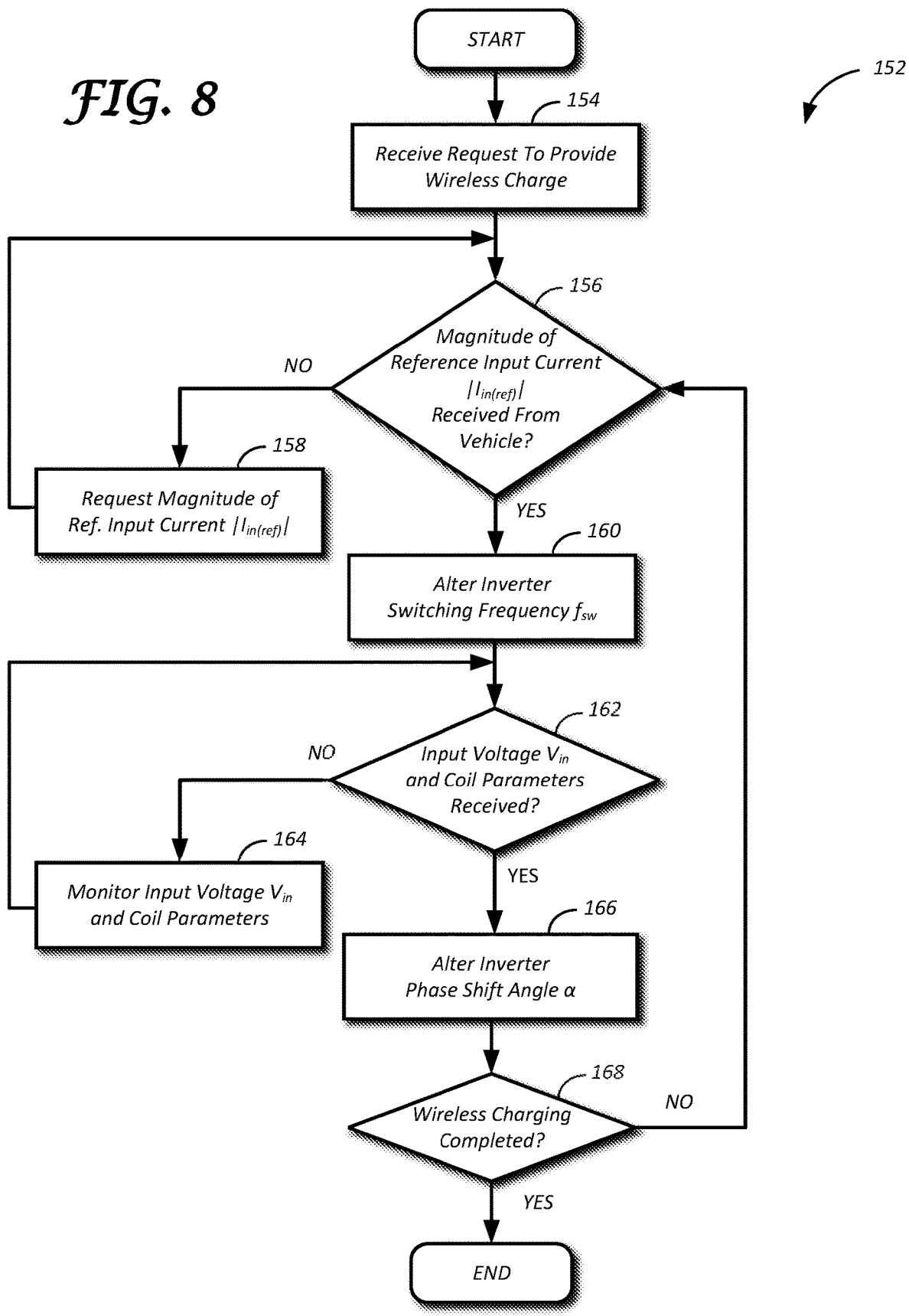
FIG. 8 is a flowchart illustrating an algorithm for integrated charging system power conditioning.

In reference to FIG. 8, an example process 152 for charging the traction battery 14 using an integrated charging system is shown. The process 152 may begin at block 154 where the control logic of the EVSE 16 receives a signal indicative of a request to provide wireless charge. In one example, the EVSE 16 in communication with the vehicle 12 receives a request from the charger 40 of the vehicle 12 to transfer energy using an integrated wireless charging system.

The control logic of the EVSE 16 determines at block 156 whether a magnitude of the reference input current $|I_{in(ref)}|$ has been received from the vehicle 12. In one example, the charger 40 of the vehicle 12 may be configured to determine the magnitude of reference input current $|I_{in(ref)}|$ based on detected output voltage $V_{out}$ 102 and transmit the determined magnitude to the EVSE 16. The charger 40 may be further configured to determine magnitude of reference input current $|I_{in(ref)}|$ based on a voltage error $e_V(t)$ between output voltage $V_{out}$ 102 and a reference input voltage $V_{0(ref)}$. At block 158 the control logic of the EVSE 16 sends a signal to the vehicle 12 indicative of a request to provide magnitude of the reference input current $|I_{in(ref)}|$ responsive to determining at block 156 that the magnitude of the reference input current $|I_{in(ref)}|$ has not been received.

At block 160 the control logic of the EVSE 16 alters switching frequency $f_{sw}$ of the DC-AC inverter 54 based on a predefined switching frequency $f_{sw}$ responsive to determining at block 156 that the magnitude of the reference input current $|I_{in(ref)}|$ has been received. The control logic may, for example, alter a switching frequency $f_{sw}$ applied to one or more switches of the DC-AC inverter 54 according to a frequency command derived from a current error $e_I(t)$ between the time-varying reference input current $|I_{in(ref)}|$ and the rectified mains line input current $I_{in}$.

The control logic of the EVSE 16 determines at block 162 whether the rectified mains line voltage $V_{in}$ and the one or more operating parameters associated with the resonant network 56 have been received. In one example, the control logic may be configured to receive one or more signals indicative of a coupling coefficient k between the transmitter and receiver coils 44, 46, transmitter coil inductance $L_p$, and receiver coil inductance $L_s$. At block 164 the control logic monitors for one or more signals indicative of the rectified mains line voltage $V_{in}$ and one or more coil operating parameters responsive to determining at block 162 that the rectified mains line voltage $V_{in}$ and/or one or more coil operating parameters have not been received.

At block 166 the control logic of the EVSE 16 alters a phase shift angle α of the DC-AC inverter 54 based on a predefined phase shift angle α. In one example, the control logic controls the one or more switching components of the DC-AC inverter 54 to alter a phase shift angle α to limit altering of a switching frequency of the DC-AC inverter 54 to a predefined specified range of frequencies. In another example, the control logic may derive a phase shift angle α from the rectified mains line voltage $V_{in}$ output by the EVSE rectifier 50 and one or more operating parameters associated with the resonant network 56.

The control logic of the EVSE 16 determines whether wireless charging of the vehicle 12 has been completed at block 168. In one example, the control logic may be configured to receive one or more signals from the vehicle 12 indicative of a request to terminate the wireless charge transfer. Responsive to determining at block 168 that the wireless charging of the vehicle 12 has not been completed, the control logic of the EVSE 16 returns to block 156. The process 152 may end responsive to the control logic determining at block 168 that the wireless charging of the vehicle 12 has been completed. In some examples, the process 152 may be repeated responsive to receiving a signal indicative of a request to provide wireless charge or in response to another signal or request.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A charging system comprising:
   an inverter configured to receive rectified mains line voltage and current to power a primary coil to induce charge current in an integrated wireless charger of a vehicle; and
   a controller configured to alter a switching frequency of the inverter based on charge voltage data of an energy storage capacitor of an on-board battery charger of the vehicle to cause the inverter to operate to drive a voltage of the energy storage capacitor toward a constant value, the energy storage capacitor being connected between a power factor correction circuit of the vehicle and an inverter of the vehicle.

2. The system of claim 1, wherein the altering of the switching frequency further causes the inverter to operate to drive a rectified mains input current phase toward a rectified mains line voltage phase.

3. The system of claim 1, wherein the controller is further configured to alter a phase shift angle of the inverter to limit the altering of the switching frequency to a specified band of frequencies.

4. The system of claim 3, wherein the altering of the phase shift angle is based on one of a primary coil inductance, a secondary coil inductance, and a coupling coefficient between the primary and secondary coils.

5. The system of claim 3, wherein the inverter includes two master switches configured to open and close responsive to a command by the controller, and wherein the altering of the phase shift angle includes altering a period of time between issuing consecutive close commands to the master switches.

6. The system of claim 1, wherein the inverter includes two master switches configured to open and close responsive to a command by the controller, and wherein the altering of the switching frequency includes, subsequent to issuing a command to open one switch, issuing a command to close another switch responsive to the voltage across the switch commanded open being less than a predefined threshold.

7. The system of claim 1, wherein the inverter includes two master switches configured to open and close responsive to a command by the controller, and wherein the altering of the frequency includes, subsequent to issuing a command to close one switch, issuing a command to open another switch responsive to current at the switch commanded closed being less than a predefined threshold.

8. A method for a vehicle comprising:
   by a controller, altering a switching frequency of an off-board inverter based on charge voltage data of an energy storage capacitor of an on-board battery charger of the vehicle to cause the off-board inverter to operate to drive a voltage of the energy storage capacitor toward a constant value, wherein the energy storage capacitor is connected between a power factor correction circuit of the vehicle and an inverter of the vehicle, and wherein the off-board inverter is configured to receive rectified mains line voltage and current to power a primary coil to induce charge current in an integrated wireless charger of the vehicle.

9. The method of claim 8, wherein the altering of switching frequency further causes the off-board inverter to operate to drive an input current phase of the off-board inverter toward a rectified mains line voltage phase.

10. The method of claim 8 further comprising altering a phase shift angle of the off-board inverter to limit the altering of the switching frequency to a specified band of frequencies.

11. The method of claim 10, wherein the altering of the phase shift angle is based on one of a primary coil inductance, a secondary coil inductance, and a coupling coefficient between the primary and secondary coils.

12. The method of claim 10, wherein the off-board inverter includes two master switches configured to open and close responsive to a command by the controller, and wherein the altering of the phase shift angle includes altering a period of time between issuing consecutive close commands to the master switches.

13. The method of claim 8, wherein the off-board inverter includes two master switches configured to open and close responsive to a command by the controller, and wherein the altering of the switching frequency includes, subsequent to issuing a command to open one switch, issuing a command to close another switch responsive to the voltage across the switch commanded open falling below a predefined threshold.

14. The method of claim 8, wherein the off-board inverter includes two master switches configured to open and close responsive to a command by the controller, and wherein the altering of the switching frequency includes, subsequent to issuing a command to close one switch, issuing a command to open another switch responsive to current at the switch commanded close falling below a predefined threshold.

* * * * *